United States Patent
Yates et al.

(10) Patent No.: US 11,593,504 B1
(45) Date of Patent: Feb. 28, 2023

(54) SYSTEMS AND METHODS FOR MANIPULATING PRUNED TREE SETS TO DETERMINE ACCESS REGIONS IN A HYPERCUBE

(71) Applicant: Workday, Inc., Pleasanton, CA (US)

(72) Inventors: John Yates, Mountain View, CA (US); Mark Hampton, Friday Harbor, WA (US); Francis Wang, Foster City, CA (US); Lian Zheng, San Jose, CA (US); Thomas Nguyen, San Jose, CA (US)

(73) Assignee: Workday, Inc., Pleasanton, CA (US)

( * ) Notice: Subject to any disclaimer, the term of this patent is extended or adjusted under 35 U.S.C. 154(b) by 723 days.

(21) Appl. No.: 16/514,805

(22) Filed: Jul. 17, 2019

(51) Int. Cl.
*G06F 21/62* (2013.01)
*H04L 29/06* (2006.01)
*G06F 16/901* (2019.01)
*G06F 16/28* (2019.01)

(52) U.S. Cl.
CPC ........ *G06F 21/6227* (2013.01); *G06F 16/283* (2019.01); *G06F 16/9027* (2019.01); *G06F 2221/2141* (2013.01)

(58) Field of Classification Search
CPC ............... G06F 21/6227; G06F 16/283; G06F 16/9027; G06F 2221/2141
See application file for complete search history.

(56) References Cited

U.S. PATENT DOCUMENTS

| | | | |
|---|---|---|---|
| 2004/0181518 A1* | 9/2004 | Mayo | G06F 16/283 |
| 2005/0256967 A1* | 11/2005 | Winter | G11B 27/034 709/231 |
| 2006/0095443 A1* | 5/2006 | Kumar | G06F 16/958 |
| 2008/0201766 A1* | 8/2008 | Amirov | H04L 63/08 726/4 |
| 2016/0306869 A1* | 10/2016 | Weller | G06F 16/282 |
| 2017/0111362 A1* | 4/2017 | Xie | G06F 21/6218 |
| 2018/0307853 A1* | 10/2018 | Mehta | G06F 16/9027 |
| 2019/0324953 A1* | 10/2019 | Hedberg | G06F 16/2246 |

* cited by examiner

*Primary Examiner* — Izunna Okeke
(74) *Attorney, Agent, or Firm* — Van Pelt, Yi & James LLP (57) ABSTRACT

A system for determining access for a hypercube includes an interface configured to receive a request for access from a user to data in a location in a hypercube; receive a tree structure with subcubes of the hypercube arranged in a hierarchical structure; and receive a user permission list, wherein an element of the user permission list comprises a permission, a root node, and a set of pruned nodes. The system also includes a processor configured to determine a user permission associated with the data in the location of the hypercube using the user permission list; and provide an indication of the user permission.

21 Claims, 11 Drawing Sheets

SYSTEMS AND METHODS FOR MANIPULATING PRUNED TREE SETS TO DETERMINE ACCESS REGIONS IN A HYPERCUBE

BACKGROUND OF THE INVENTION

Planning systems typically utilize a large multidimensional data space for representing complex systems or organizations. The data space can easily include billions of cells requiring calculations. Formulas for calculating cell values include references to other cell values, creating a complex network of references. This large planning system is typically contributed to by a plurality of contributors (e.g., contributors from different departments, contributors working on different products, etc.) and accessed by a plurality of accessors (e.g., managers, business planners, etc.). Different users are entitled to different levels of access, for different parts of the planning system, necessitating a tool for managing the access. Given the large multidimensional nature of the planning system, storing the access information can become very difficult.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining access for a hypercube comprises an interface configured to receive a request for access from a user to data in a location in a hypercube, receive a tree structure with subcubes of the hypercube arranged in a hierarchical structure, receive a user permission list, wherein an element of the user permission list comprises a permission, a root node, and a set of pruned nodes, and a processor configured to determine a user permission associated with the data in the location of the hypercube using the user permission list, and provide an indication of the user permission. In some embodiments, the system further comprises a memory coupled to the processor and configured to provide instructions to the processor.

A system for determining access to a hypercube stores access permissions using a global permission list and a tree structure. In various embodiments, the interface calls requesting access comprise: 1) for a given dimension, what values on a given dimension does the user have any access for, 2) for this grid of locations, what access does the user have for each cell, or any other appropriate request for access. The tree structure comprises a directed acyclic graph, wherein each node represents a subspace of its parent node. The global permission list comprises a set of elements, each element associated with a user or set of users and comprising a permission, a root node, and a set of pruned nodes. When a user requests access to a node the system first determines a user permission list, wherein the user permission list comprises the elements of the global permission list that are associated with the user requesting permission. Elements of the user permission list are sorted by the associated permission type (e.g., sorted from the most permissive to least permissive, sorted from the least permissive to the most permissive, etc.). For example, permission types, from most permissive to least permissive comprise write permission, import and notes permission, read except notes permission, read permission, read with no splits permission, and no permission. In some embodiments, in the event it is determined that multiple elements of the user permission list apply to the same cell for a given user, the more permissive permission type is used. Sorting the elements of the user permission list from most to least productive allows the elements of the user permission list to be scanned from first to last for applicability and the first applicable element found can then be used without considering the later elements in the sorted list, thus increasing computation efficiency. In some embodiments, in the event it is determined that multiple elements of the user permission list apply to the same cell for a given user, the least permissive permission type is used. This can be accomplished in a similar way to the above by sorting the elements of the user permission list from least permissive to most permissive, and again selecting the first applicable element found without considering the later elements in the sorted list.

The system uses root nodes of trees (both of a set of main roots and of a list of pruned nodes) and the access privileges associated with the root nodes, where the root nodes' access privileges can be used to represent the access privileges for all of their children. The system is able to define pruned spaces by identifying where the children of the main roots overlap—for example, identifying a top node of a pruned space and identifying the access privileges associated with the pruned space. In some embodiments, the access privileges in the overlap children are the access privileges that are least restrictive of the overlap parents. In some embodiments, the access privileges in the overlap children are the access privileges that are the most restrictive of the overlap parents.

In some embodiments, a root node or a main node is the top node that is used to specify permission access to its children nodes. In various embodiments, a root node or a main node can be found anywhere in the hypercube and there can be one root node or main node or multiple root nodes or main nodes.

The system determines whether an element of the user permission list is applicable to a user request for data at a location in the hypercube using the tree structure and the root node and set of pruned nodes of the element. The root node and set of pruned nodes of the element reference nodes of the tree structure. Each node of the tree structure references a sub-cube of the hypercube. It is determined that the element of the user permission list is applicable to the location in the event the location is a descendant of the root node of the tree structure (e.g., the location is in the sub-cube indicated by the root node) and the location is not a descendant of a pruned node of the set of pruned nodes (e.g., the location is not in any of the sub-cubes indicated by the pruned nodes). The sub-cube indicated by the root node indicates a region where a permission applies, and sub-cubes indicated by the pruned nodes indicate sub-regions within the root node region where the permission does not apply. In response to a determination of a user permission associated with the data in the location of the hypercube, an indication of the user permission is provided. For example, the data in the location in the hypercube is then provided according to the user permission. The use of a root node enables specifying permissions that trickle down to all descendants of the root node with the exception of those nodes that are part of the pruned set of nodes. In some embodiment, the use of the root node and pruned set of nodes enables allocation of the nodes in the tree structure in a complex but efficient manner. For example, this method is efficient as all nodes below a root node can inherit the permissions of the root node, but also the downstream nodes of the tree structure can be pruned so as not to inherit by above nodes by using the set of pruned nodes to designate different permissions for those nodes designated in the credential documentation. In some embodiments, in addition to a root node of the entire tree being specified in an element of the permission list, any other type of node (e.g., a parent node, a child node, etc.) can be specified as the base (or root node) from which permissions trickle down to descendants.

The description herein is focused on one dimension, however, a person practiced in the art could easily see how the following is extendible to multiple dimensions.

The system for determining access for a hypercube improves the computer by providing a simple and compact representation of a large multidimensional data storage structure to indicate permissions applicable to different regions of the data structure. The system includes an efficient method for resolving intersections of regions where different permissions apply and a simple user interface for specifying access regions with associated permissions. Using layers of these access region entries, a particular user can be given highly configurable access to the model that corresponds to their role and responsibilities to the organization.

Figure 1:
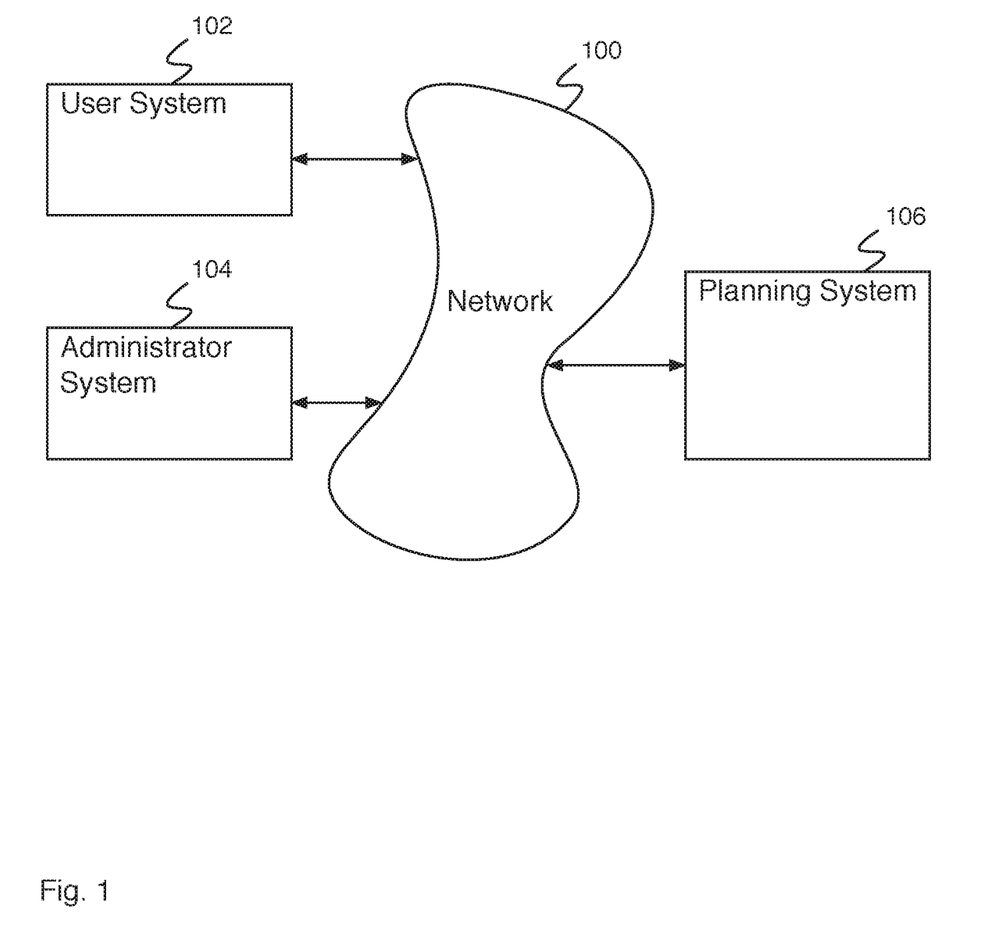
FIG. 1 is a block diagram illustrating an embodiment of a network system.

FIG. 1 is a block diagram illustrating an embodiment of a network system. In some embodiments, the network system of FIG. 1 comprises a network system for a planning system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, and planning system 106 communicate via network 100.

User system 102 comprises a user system for use by a user. A user uses user system 102 to interact with planning system 106—for example, to store planning data, to request planning data, to request reporting based on planning data, to evaluate planning calculations, etc. In some embodiments, the network system of FIG. 1 comprises a plurality of user systems associated with one or more users. Administrator system 104 comprises an administrator system for use by an administrator. Administrator system 104 comprises an administrator system for executing administrator commands, for configuring planning system 106, etc.

Planning system 106 comprises a planning system for organizational planning. For example, planning system 106 comprises data and computations arranged in a grid form. Planning system 106 comprises a plurality of dimensions for data organization (e.g., planning system 106 comprises a hypercube). For example, planning system 106 comprises an interface configured to receive a request for access from a user to data in a location in a hypercube, receive a tree structure with subcubes of the hypercube arranged in a hierarchical structure, receive a user permission list, wherein an element of the user permission list comprises a permission, a root node, and a set of pruned nodes, and a processor configured to determine a user permission associated with the data in the location of the hypercube using the user permission list, and provide an indication of the user permission.

Figure 2:
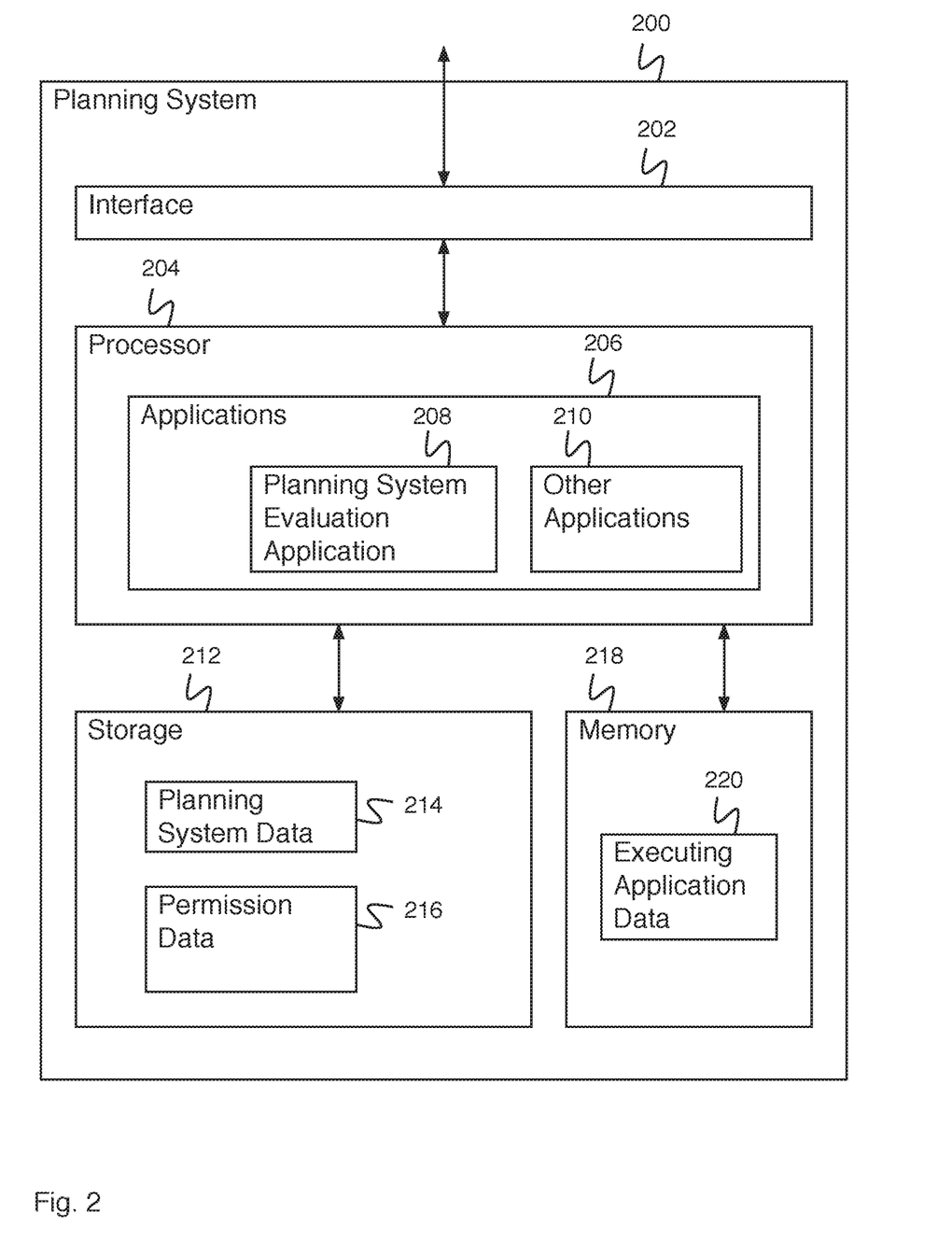
FIG. 2 is a block diagram illustrating an embodiment of a planning system

FIG. 2 is a block diagram illustrating an embodiment of a planning system. In some embodiments, planning system 200 of FIG. 2 comprises planning system 106 of FIG. 1. In the example shown, planning system 200 comprises interface 202. Interface 202 comprises an interface for communicating with external systems using a network. For example, interface 202 comprises an interface for communicating with a user system (e.g., for receiving planning data, for receiving a formula definition, for receiving a request to update a planning system, etc.). Processor 204 comprises a processor for executing applications 206. Applications 206 comprise planning system evaluation application 208 and other applications 210. For example, planning system evaluation application 208 receives a request for access from a user to data in a location in a hypercube, receives a tree structure with subcubes of the hypercube arranged in a hierarchical structure, receives a user permission list, wherein an element of the user permission list comprises a permission, a root node, and a set of pruned nodes, determines a user permission associated with the data in the location of the hypercube using the user permission list, and provides an indication of the user permission. Other applications 210 comprises any other appropriate applications (e.g., a communications application, a chat application, a web browser application, a document preparation application, a data storage and retrieval application, a user interface application, a data analysis application, etc.). Planning system 200 additionally comprises storage 212. Storage 212 comprises planning system data 214 (e.g., comprising historical data, projected data, formula data, etc.) and permission data 216 (e.g., permission data comprising a global permission list, a user permission list, a tree structure, etc.). Planning system 200 additionally comprises memory 218. Memory 218 comprises executing application data 220 comprising data associated with applications 206.

Figure 3:
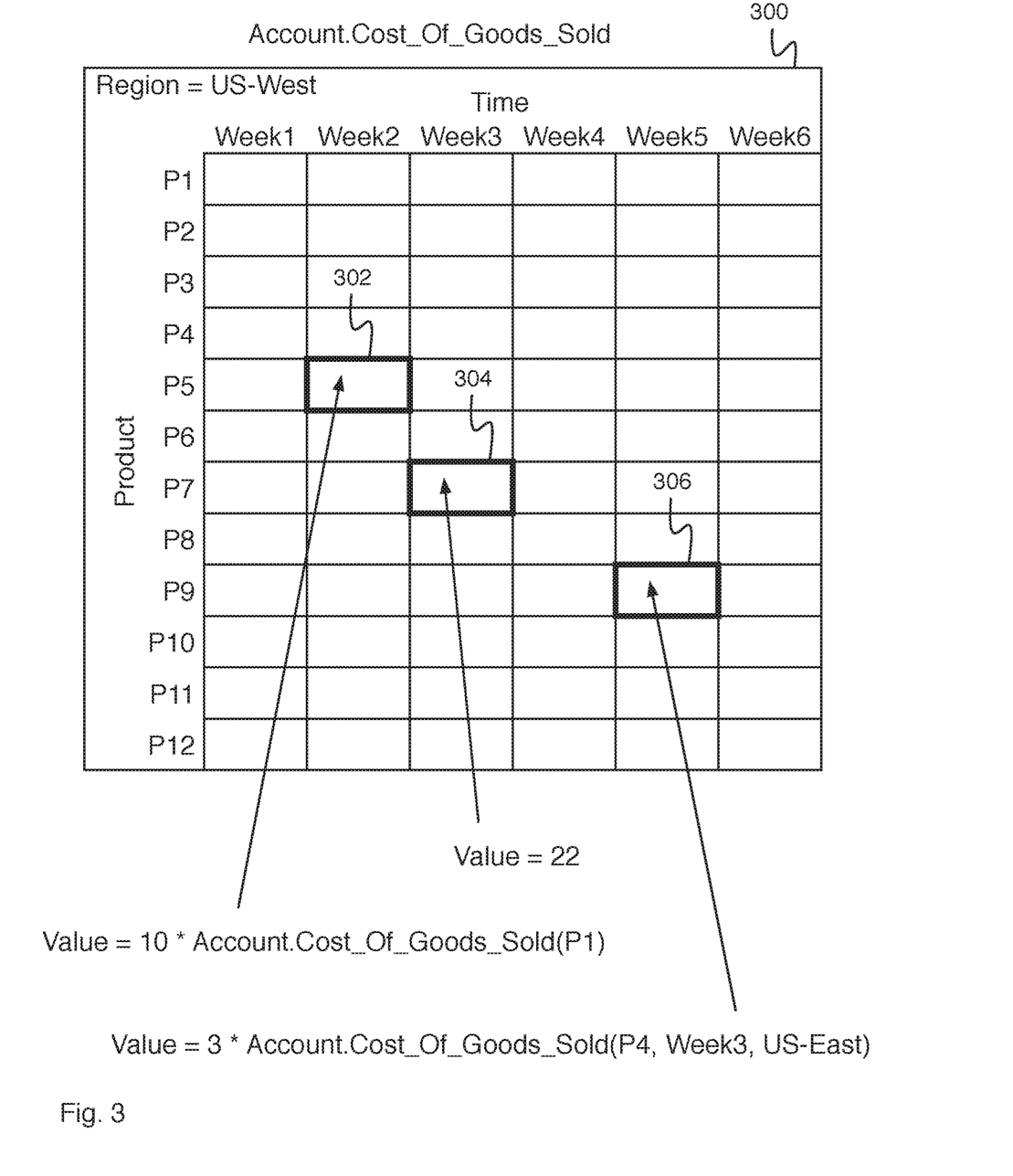
FIG. 3 is a diagram illustrating an embodiment of a portion of planning system data.

FIG. 3 is a diagram illustrating an embodiment of a portion of planning system data. In some embodiments, planning system data 300 is stored in planning system data 214 of FIG. 2. In the example shown, planning system data 300 comprises a plurality of cells. The location of each cell is associated with values of each of a set of dimensions. For example, cell 302 is associated with Product=P5 and Time=Week2. All cells shown in planning system data 300 are associated with Region=US-West and Account=Cost_Of_Goods_Sold. Other portions of planning system data that are not shown are associated with other values for Region or Account. For example, planning system data 300 shows only a portion of a hypercube of data and formula cells.

Cells of planning system data 300 store either a formula or a value (e.g., a number, a string, etc.). For example, cell 304 comprises the number 22. Cell 306 comprises the formula Value=3*Account.Cost_Of_Goods_Sold(P4, Week3, US-East). The portion of the formula "Account-.Cost_Of_Goods_Sold(P4, Week3, US-East)" comprises a reference to the value stored in the cell associated with Account=Cost_Of_Goods_Sold, Region=US-East, Product=P4, and Time=Week3. The reference comprises a term. Cell 302 comprises the formula Value=10*Account.Cost_Of_Goods_Sold(P1). The term of the formula of cell 302 indicates Account=Cost_Of_Goods_Sold and Product=P1, however, other dimensions are not indicated in the term. The other dimensions are inherited from the scope of the cell. For example, the term of the formula of cell 302 inherits Region=US-West and Time=Week2. For example, using inheritance, the same formula can have different values if it is stored in different locations of the hypercube.

Figure 4:
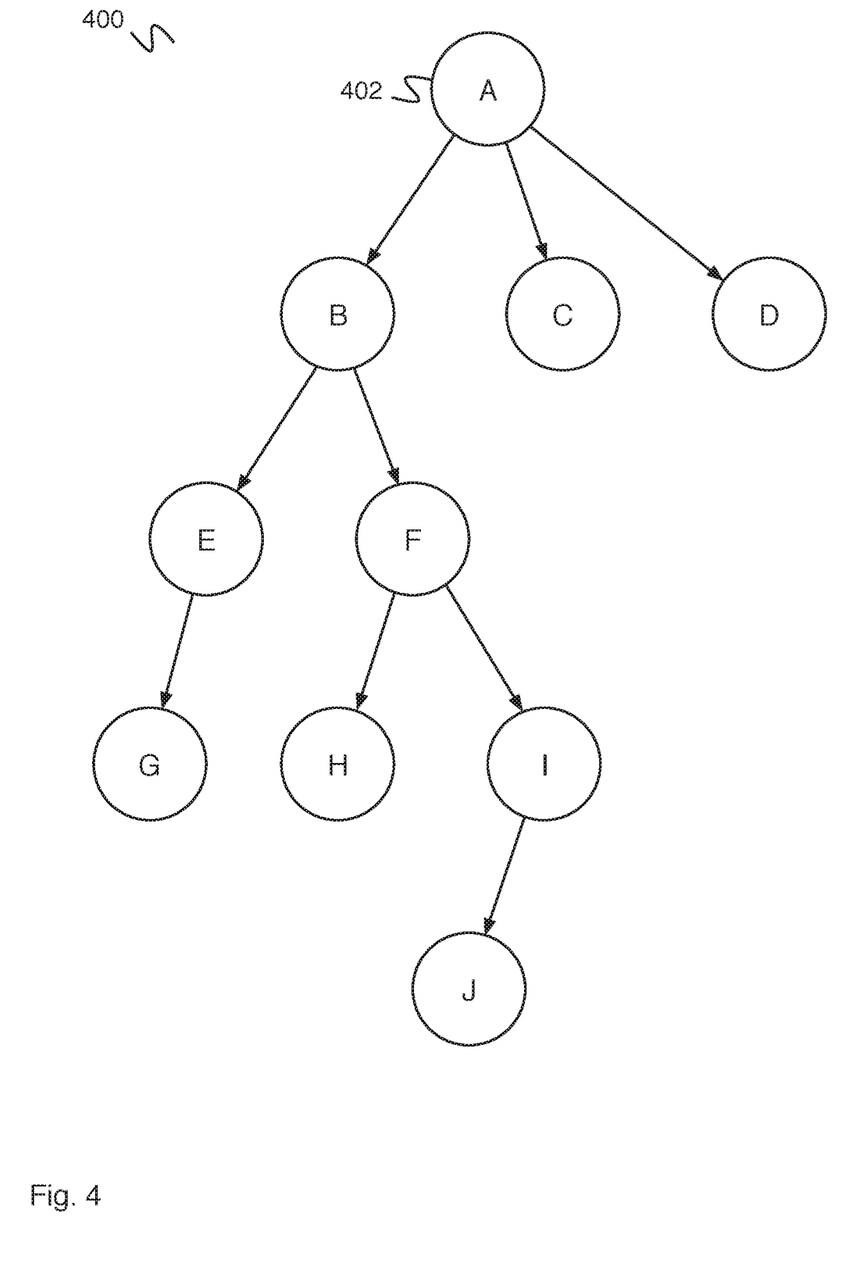
FIG. 4 is a diagram illustrating an embodiment of a tree structure.

FIG. 4 is a diagram illustrating an embodiment of a tree structure. In some embodiments, tree structure 400 of FIG. 4 represents receive a tree structure with subcubes of the hypercube arranged in a hierarchical structure of planning system data 214 and/or permission data 216 of FIG. 2. In the example shown, tree structure 400 comprises a directed acyclic graph. Tree structure 400 comprises a plurality of nodes (e.g., node 402 and other nodes) and a plurality of relations between nodes. Relations between nodes comprise directional relations (e.g., indicating a parent-child relationship). A directed acyclic graph comprises no cycles (e.g., starting at any node and following the arrows of directional relations will never lead back to the starting node). Node 402 (e.g., "node A") comprises no parent and tree children. For example, node 402 comprises the root node of tree 400. In a connected directed acyclic graph (e.g., all nodes of the graph are connected to all other nodes by one or more parent or child relationships) there is one node with no parent node, referred to as the root node. All other nodes of tree structure 400 comprise a parent node and zero or more children. Node B, node C, and node D are children of node A. Node E and node F are children of node B. Node G is the child of node E; nodes H and I are the children of node F; and node J is the child of node I. In some embodiments, tree structure 400 is used to represent subspaces of a hypercube. For example, each node of tree structure 400 represents a portion of a hypercube. In some cases, a child node of a parent node is used to represent a subspace of the portion of the hypercube (e.g., the set of nodes that cascade beneath the child node of the parent node). In some embodiments, an algorithmic test for determining the ancestor—descendant relationship of two nodes exists (e.g., given a first node and a second node, are the nodes the same node; is it the case that the first node is an ancestor of the second node; is it the case that the second node is an ancestor of the first node; or is there no direct ancestor—descendant relationship). For example, node G is a descendant of node B; node H and node D have no direct relationship.

Figure 5:
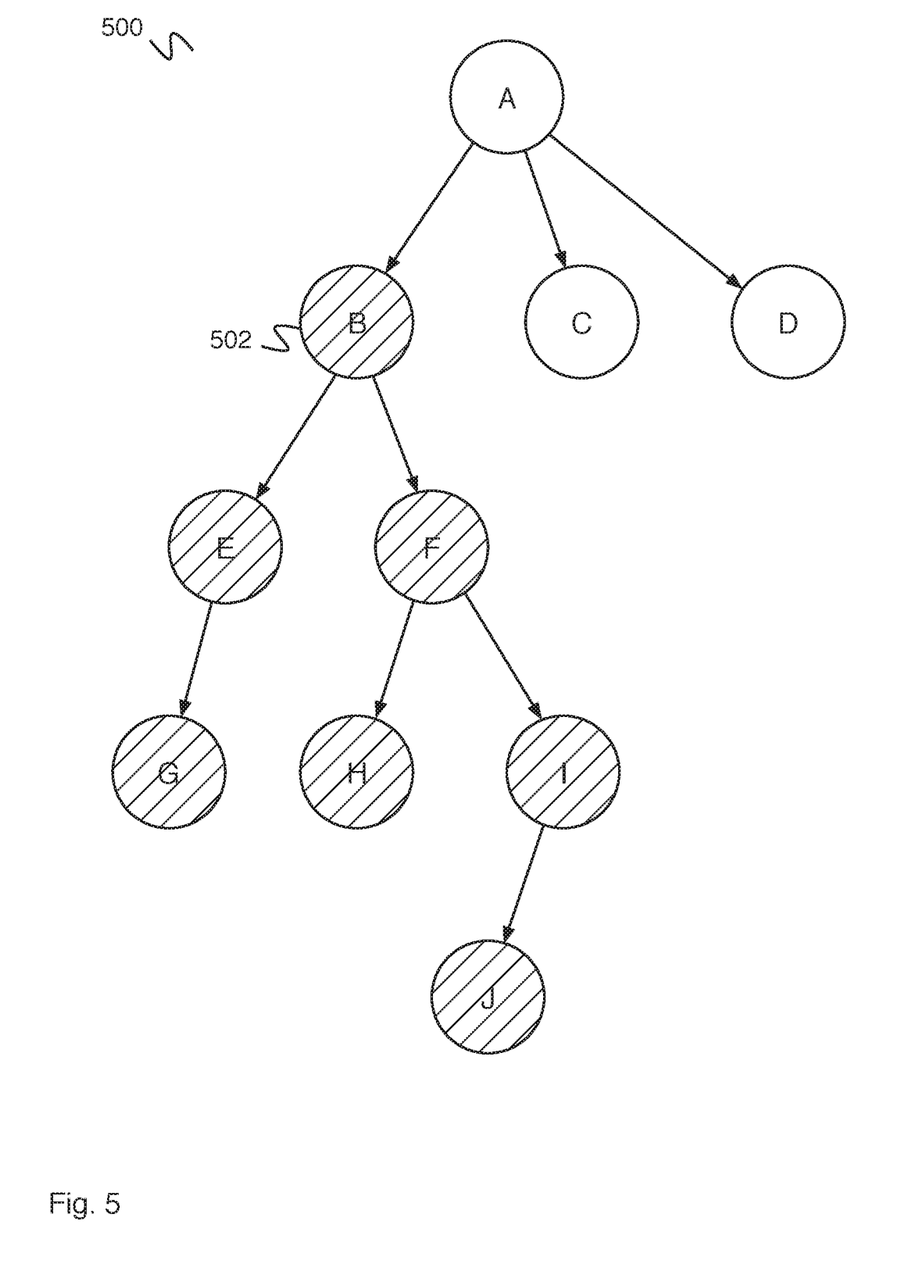
FIG. 5 is a diagram illustrating an embodiment of a subtree.

FIG. 5 is a diagram illustrating an embodiment of a subtree. In some embodiments, tree 500 comprises tree 400 of FIG. 4. In the example shown, a subtree of tree 500 is indicated by hatching. The subtree of tree 500 is rooted at node 502 (e.g., "node B"). Node B is associated with no parent node within the subtree. For example, the subtree of tree 500 comprises node B and all descendants of node B (e.g., node B, node E, node F, node G, node H, node I, and node J). Nodes of the subtree can be used to represent subspaces of the hypercube. In some embodiments, it can be determined whether a node is part of the subtree of tree 500 rooted at node 502 by determining whether the node is a descendant of node 502 (e.g., using an algorithmic test for determining the ancestor—descendant relationship of two nodes).

Figure 6:
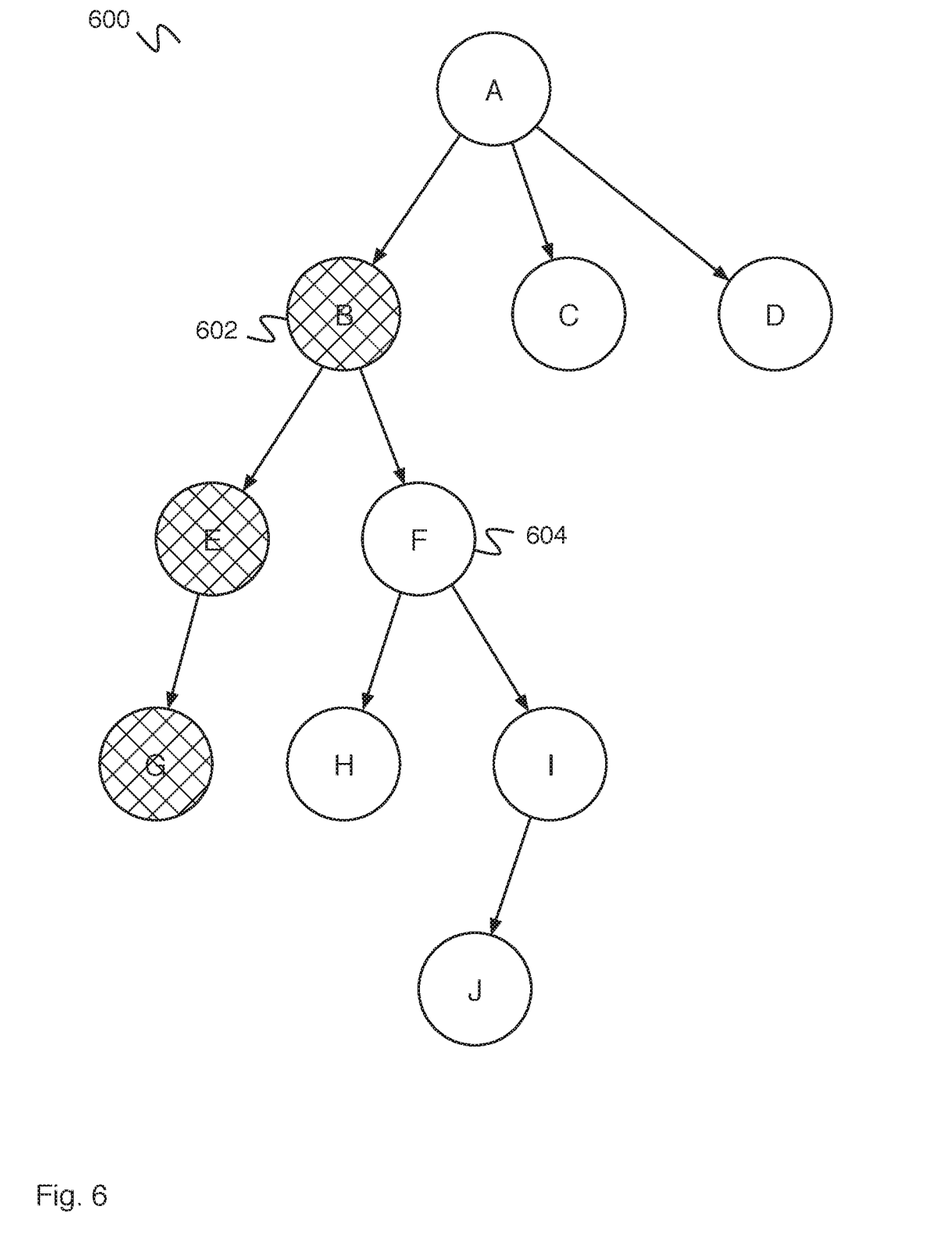
FIG. 6 is a diagram illustrating an embodiment of a pruned subtree.

FIG. 6 is a diagram illustrating an embodiment of a pruned subtree. In some embodiments, tree 600 comprises tree 400 of FIG. 4. In the example shown, a pruned subtree of tree 600 is indicated by hatching. The pruned subtree of tree 600 is rooted at node 602 (e.g., "node B") and has a subtree rooted at node 604 (e.g., "node F") pruned from it. For example, the pruned subtree of tree 600 comprises all descendants of node B other than node F and its descendants (e.g., the pruned subtree comprises node B, node E, and node G). For example, all nodes of the pruned subtree represent subspaces of a subspace of a hypercube represented by node B not including the subspace of the hypercube represented by node F. In some embodiments, it can be determined whether a node is part of the pruned subtree of tree 600 rooted at node 602 with the subtree rooted at node 604 pruned by determining whether the node is a descendant of node 602 and is not a descendant of node 604.

Figure 7:
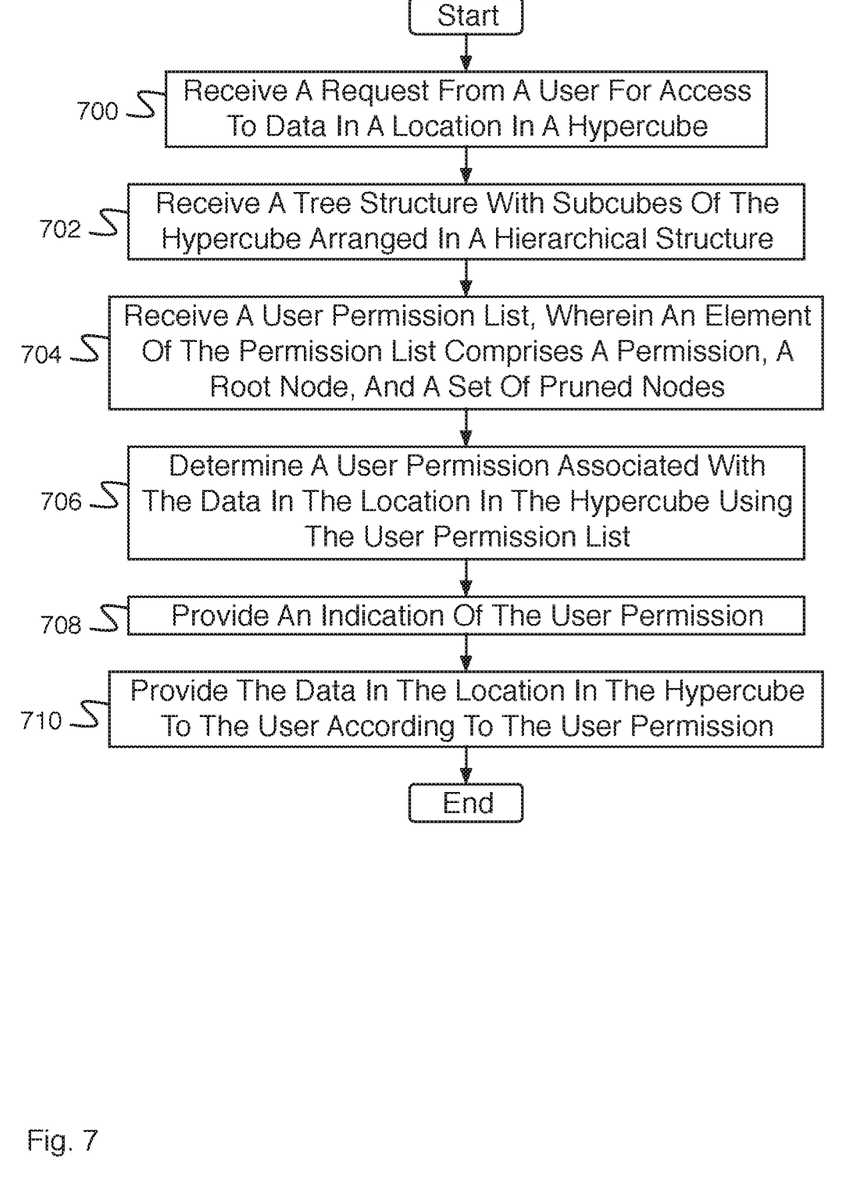
FIG. 7 is a flow diagram illustrating an embodiment of a process for determining access for a hypercube.

FIG. 7 is a flow diagram illustrating an embodiment of a process for determining access for a hypercube. In some embodiments, the process of FIG. 7 is executed by planning system 106 of FIG. 1. In the example shown, in 700, a request is received from a user for access to data in a location in a hypercube. In 702, a tree structure is received with subcubes of the hypercube arranged in a hierarchical structure. For example, a directed acyclic graph is provided representing regions of the hypercube and their relations within a tree structure. In 704, a user permission list is received, wherein an element of the permission list comprises a permission, a root node, and a set of pruned nodes. For example, the user permission list comprises a subset of a global permission list comprising entries of the global permission list associated with the user. In some embodiments, the set of pruned nodes comprise an empty set of nodes. In 706, a user permission associated with the data in the location in the hypercube is determined using the user permission list. In 708, an indication of the user permission is provided. In 710, the data in the location in the hypercube is provided to the user according to the user permission.

For example, the user permission comprises one of write permission, import and notes permission, read except notes permission, read permission, read with no splits permission, and no permission. In some embodiments, in response to determining that the user permission comprises write permission, providing the data in the location in the hypercube to the user according to the user permission comprises providing the data in the location in the hypercube to the user along with the ability to modify the data in the location in the hypercube. In response to determining that the user permission comprises import and notes permission, providing the data in the location in the hypercube to the user according to the user permission comprises enabling a user to import the data into the location and write and/or modify notes associated with the location. In response to determining that the user permission comprises read except notes permission, providing the data in the location in the hypercube to the user according to the user permission comprises providing read access to the data in the location in the hypercube to the user without providing access to notes associated with the data in the location in the hypercube. In response to determining that the user permission comprises read permission, providing the data in the location in the hypercube to the user according to the user permission comprises providing read access to the data in the location in the hypercube to the user. In response to determining that the user permission comprises read with no splits permission, providing the data in the location in the hypercube to the user according to the user permission comprises allowing a user to access information by reading a location but not enabling reading transaction information (e.g., splits). In response to determining that the user permission comprises no permission, providing the data in the location in the hypercube to the user according to the user permission comprises providing no access to the data in the location in the hypercube to the user.

Figure 8:
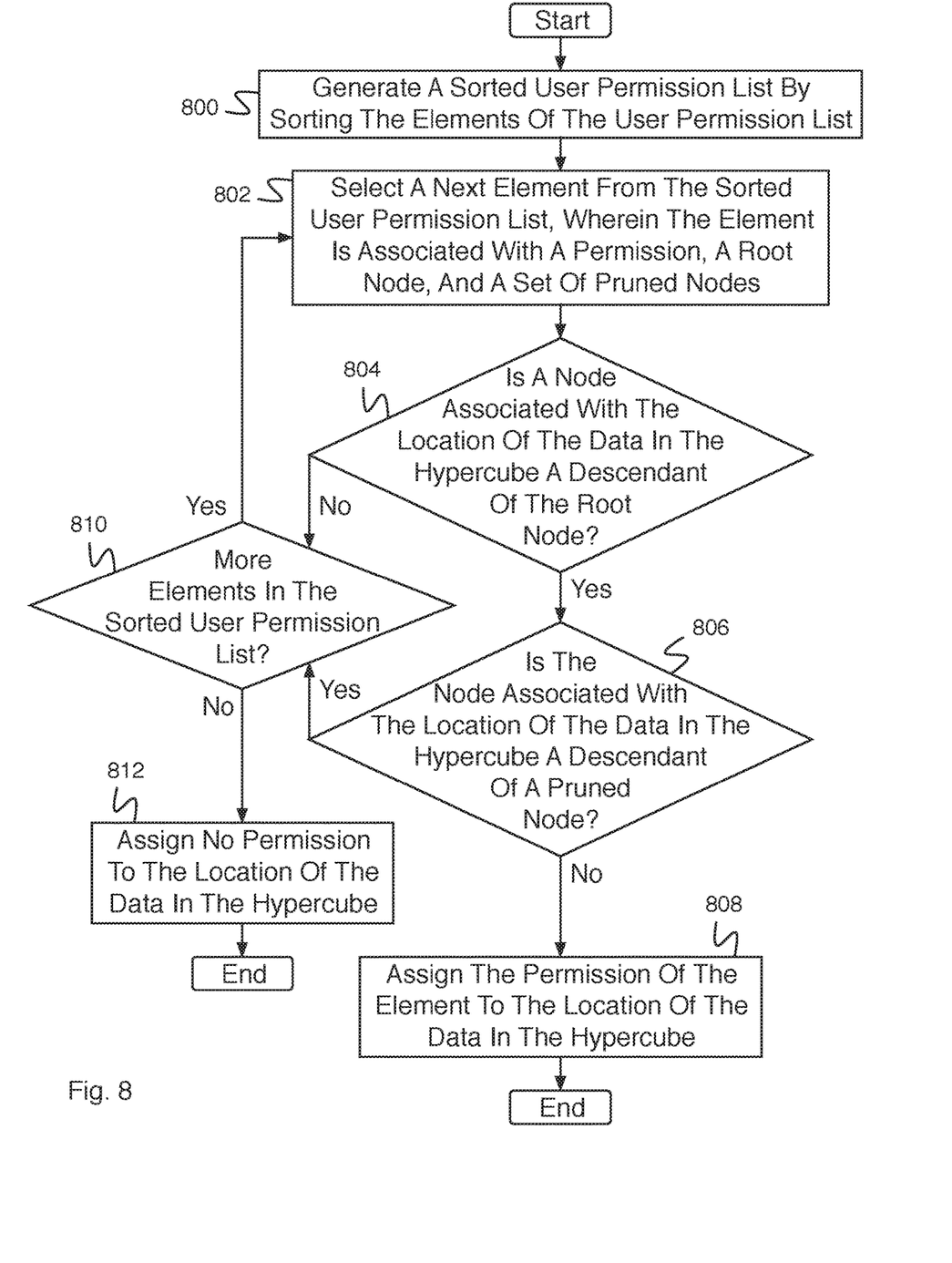
FIG. 8 is a flow diagram illustrating an embodiment of a process for determining a user permission associated with data in a location in a hypercube using a user permission list.

FIG. 8 is a flow diagram illustrating an embodiment of a process for determining a user permission associated with data in a location in a hypercube using a user permission list. In some embodiments, the process of FIG. 8 implements 706 of FIG. 7. In the example shown, in 800, a sorted user permission list is generated by sorting the elements of the user permission list. For example, the elements of the user permission list are sorted from most to least permissive or the elements of the user permission list are sorted from least to most permissive. In 802, a next element is selected from the sorted permission list, wherein the element is associated with a permission, a root node, and a set of pruned nodes. In some embodiments, the element of the user permission list further comprises a dimension associated with the element. In 804, it is determined whether a node associated with the location of the data in the hypercube is a descendant of the root node. In response to determining that the node associated with the location of the data in the hypercube is not a descendant of the root node, control passes to 810. In response to determining that the node associated with the location of the data in the hypercube is a descendant of the root node, control passes to 806. In 806, it is determined whether the node associated with the location of the data in the hypercube is a descendant of a pruned node. In response to determining that the node associated with the location of the data in the hypercube is a descendant of a pruned node, control passes to 810. In response to determining in 806 that the node associated with the location of the data in the hypercube is not a descendant of a pruned node, control passes to 808. In 808, the permission of the element is assigned to the location of the data in the hypercube. For example, assigning the permission of the element to the location of the data in the hypercube comprises assigning the permission of the element to the location of the data in the hypercube for a first element of the sorted list that the user is determined to have has permission. The process then ends. In 810, it is determined whether there are more elements in the sorted user permission list. In response to determining that there are more elements in the sorted user permission list, control passes to 802. In response to determining that there are not more elements in the sorted user permission list, control passes to 812. In 812, no permission is assigned to the location of the data in the hypercube, and the process ends.

Figure 9:
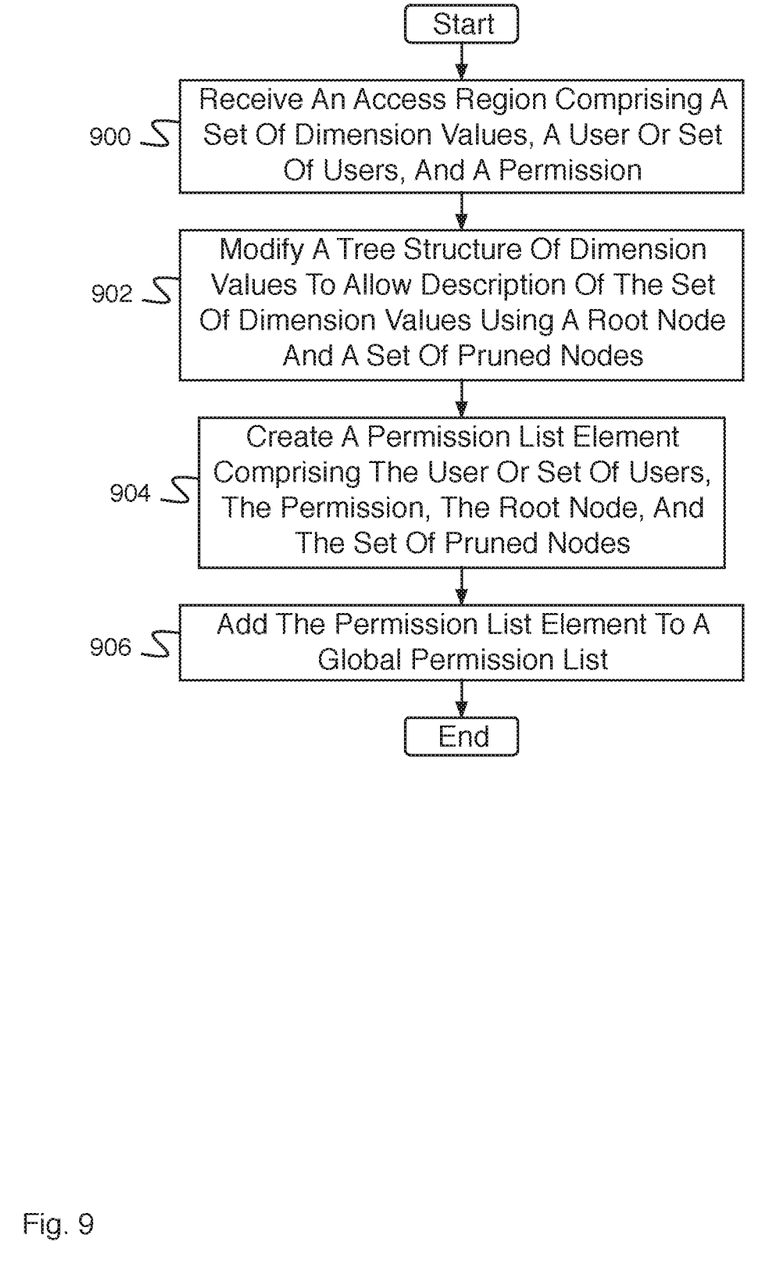
FIG. 9 is a flow diagram illustrating an embodiment of a process for adding a permission list element to a permission list.

FIG. 9 is a flow diagram illustrating an embodiment of a process for adding a permission list element to a permission list. In some embodiments, the process of FIG. 9 is executed by planning system 106 of FIG. 1. In the example shown, in 900, an access region is received comprising a set of dimension values, a user or set of users, and a permission. In 902, a tree structure of dimension values is modified to allow description of the set of dimension values using a root node and a set of pruned nodes.

For example, modifying the tree structure of dimension values to allow description of the set of access region dimension values using the root node and the set of pruned nodes comprises adding a new node to the tree structure corresponding to the set of access region dimension values; adding a new subtree to the tree structure corresponding to the set of access region dimension values; or adding a new node to the tree structure corresponding to the pruned set of dimension values for pruning (e.g., a subtree rooted at an ancestor node comprising an ancestor of the new node, wherein the new node is pruned from the subtree, corresponds to the set of access region dimension values). In 904, a permission list element is created comprising the user or set of users, the permission, the root node, and the set of pruned nodes. In 906, the permission list element is added to a global permission list.

Figure 10:
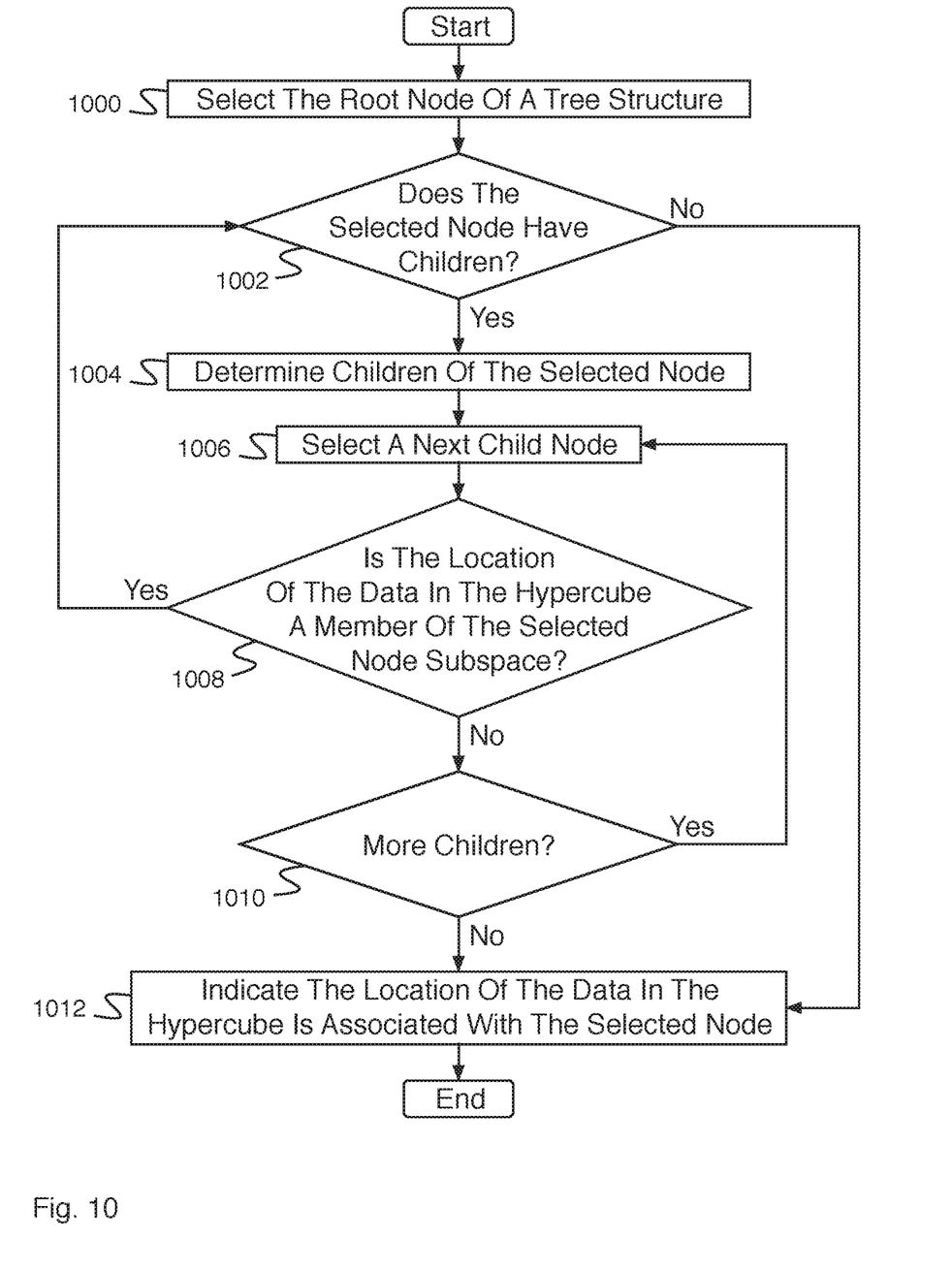
FIG. 10 is a flow diagram illustrating an embodiment of a process for determining a node associated with a location of data in a hypercube.

FIG. 10 is a flow diagram illustrating an embodiment of a process for determining a node associated with a location of data in a hypercube. In some embodiments, the process of FIG. 10 comprises a process for determining a node associated with the location of the data in the hypercube of 804 of FIG. 8 or 806 of FIG. 8. In the example shown, in 1000, the root node of a tree structure (e.g., a tree structure with subcubes of a hypercube arranged in a hierarchical structure) is selected. In 1002, it is determined whether the selected node has children. In response to determining that the selected node does not have children, control passes to 1012. In response to determining that the selected node has children, control passes to 1004. In 1004, children of the selected node are determined. In 1006, a next child node is selected. In 1008, it is determined whether the location of the data in the hypercube is a member of the selected node subspace. In response to determining that the location of the data in the hypercube is a member of the selected node subspace, control passes to 1002. In response to determining that the location of the data in the hypercube is not a member of the selected node subspace, control passes to 1010. In 1010, it is determined whether there are more children (e.g., more children of the set of children determined in 1004). In response to determining in 1010 that there are more children, control passes to 1006. In response to determining in 1010 that there are not more children, control passes to 1012. In 1012, the process indicates that the location of the data in the hypercube is associated with the selected node.

Figure 11:
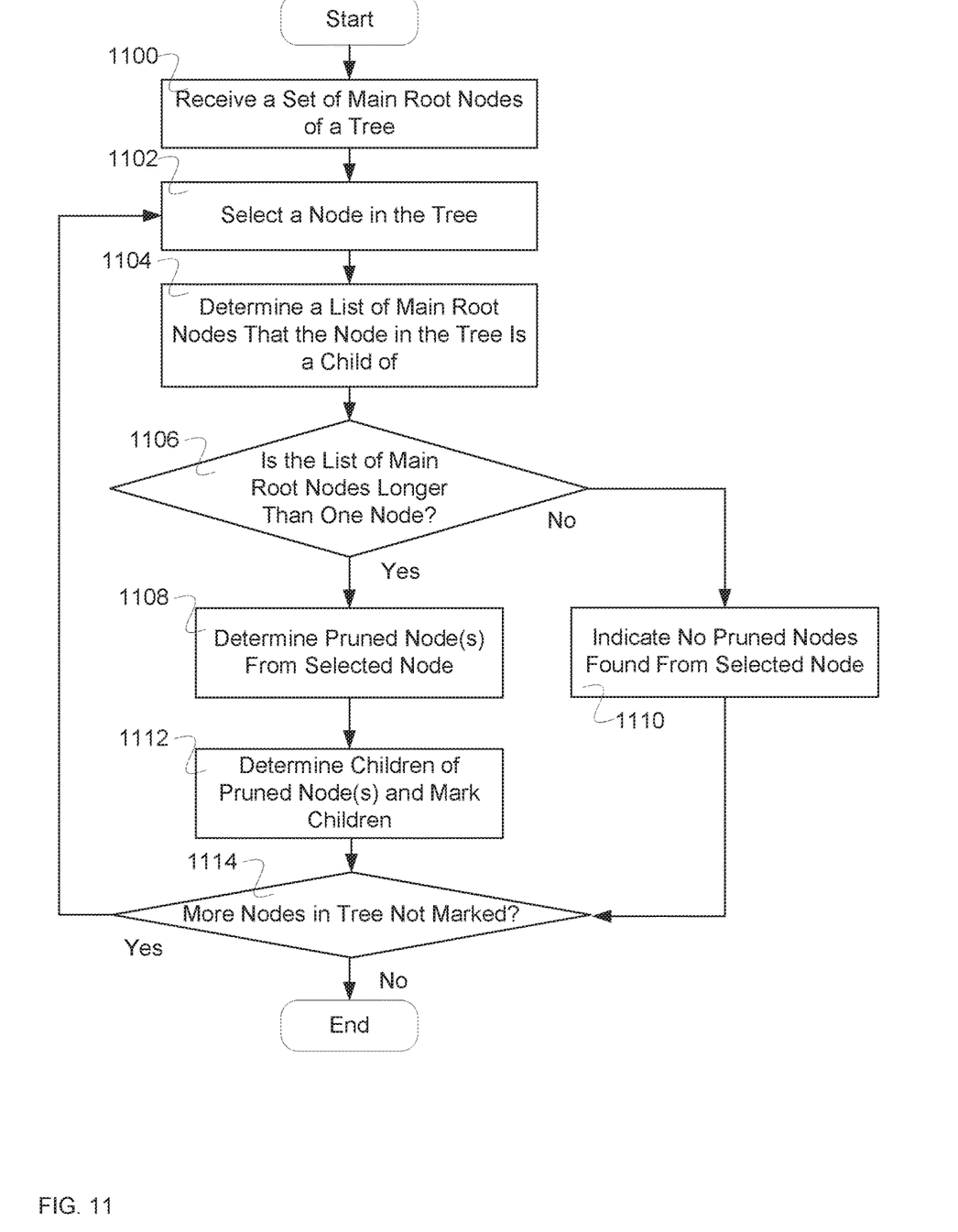
FIG. 11 is a flow diagram illustrating an embodiment of a flow to determine pruned nodes.

FIG. 11 is a flow diagram illustrating an embodiment of a flow to determine pruned nodes. In some embodiments, the process of FIG. 11 is used to determine a main root node and a list of pruned nodes of FIG. 7. In some embodiments, the main root node is one of a plurality of main root nodes. The usefulness of the pruned tree idea is that the root node of the trees (both of the main roots and the list of pruned nodes) can be used to represent all their children when working with the one set thus the children do not have to be checked. To determine whether a location is in a pruned set, it needs to be determined what it is in the root node's tree and not in any of the trees represented by the pruned nodes. With the data structure used to represent the trees, this determination is simple and efficient. So in the event that it is desired to determine access privileges for a location x in the pruned tree with main root A, pruned node B, pruned node C, and pruned node D, access can be checked by checking whether the node is a child of A and not a child of B, C, or D and assigning privileges based on those checks. Similarly, in the event it is desired to enumerate the members of a given set and its privileges, the data structures make it easy/efficient to obtain the list of all descendants of a node AND make it easy to "prune out" the pruned node and its descendants. It reduces to "take the values from this array from index Astart to Aend except for those between Bstart and Bend, Cstart and Cend and Dstart and Dend, which does not involved looping through possibly millions of values.—just 4 block copies.

In the example shown, in 1100 a set of main root nodes of a tree is received. In 1102 a node in the tree is selected. In 1104, a list of main root nodes that the node in the tree is a child of is determined. In 1106, it is determined whether the list of main root nodes is longer than one node. In response to the list of main root nodes not being longer than one node, in 1110 it is indicated that no pruned nodes found from the selected node, and control passes to 1114. In response to the list of main root nodes being longer than one node, in 1108 pruned node(s) is/are determined from selected node. In 1112, children of pruned node(s) are determined and children of the pruned node(s) are determined. In 1114, it is determined whether there are more nodes in the tree that are not marked. In response to there not being more nodes in the tree that are not marked, the process ends. In response to there being nodes in the tree that are not marked, control passes to 1102.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining access for a hypercube, comprising:
an interface configured to:
receive a request for access from a user to data in a location in a hypercube;
receive a tree structure with subcubes of the hypercube arranged in a hierarchical structure; and
receive a user permission list, wherein an element of the user permission list comprises a permission, a root node, and a set of pruned nodes, wherein the permission does not apply to the set of pruned nodes; and
a hardware processor configured to:
determine a user permission associated with the data in the location of the hypercube using the user permission list, wherein determining the user permission is based at least in part on whether a node associated with the location in the hypercube is pruned from a tree rooted at the root node;
provide an indication of the user permission; and
receive an access region comprising a set of access region dimension values, an access region user or set of users, and an access region permission;
modify a tree structure of dimension values to allow description of the set of access region dimension values using the root node and the set of pruned nodes;
create a permission list element comprising the user or set of users, the permission, the root node, and the set of pruned nodes; and
add the permission list element to a global permission list.

2. The system of claim 1, wherein the hardware processor is further configured to provide the data in the location in the hypercube to the user according to the user permission.

3. The system of claim 2, wherein, in response to determining that the user permission comprises write permission, providing the data in the location in the hypercube to the user according to the user permission comprises providing the data in the location in the hypercube to the user along with an ability to modify the data in the location in the hypercube.

4. The system of claim 2, wherein, in response to determining that the user permission comprises import and notes permission, providing the data in the location in the hypercube to the user according to the user permission comprises allowing the user to import into and/or write notes for the data in the location.

5. The system of claim 2, wherein, in response to determining that the user permission comprises read except notes permission, providing the data in the location in the hypercube to the user according to the user permission comprises providing read access to the data in the location in the hypercube to the user without providing access to notes associated with the data in the location in the hypercube.

6. The system of claim 2, wherein, in response to determining that the user permission comprises read permission, providing the data in the location in the hypercube to the user according to the user permission comprises providing read access to the data in the location in the hypercube to the user.

7. The system of claim 2, wherein, in response to determining that the user permission comprises read with no splits permission, providing the data in the location in the hypercube to the user according to the user permission comprises allowing the user to access information by reading the location but not allowing reading a transaction information.

8. The system of claim 2, wherein, in response to determining that the user permission comprises no permission, providing the data in the location in the hypercube to the user according to the user permission comprises providing no access to the data in the location in the hypercube to the user.

9. The system of claim 1, wherein determining the user permission comprises:
   selecting a node associated with the location of the data in the hypercube,
   determining that the selected node is descendent from the root node of the element; and
   determining that the selected node is not descendent from a pruned node of the set of pruned nodes.

10. The system of claim 1, wherein determining a user permission comprises generating a sorted user permission list by sorting the user permission list.

11. The system of claim 10, wherein the sorted user permission list is sorted from most to least permissive permission associated with a first element, wherein for the first element of the sorted user permission list that the user is determined to have permission, assigning the permission of the element to the location of the data in the hypercube.

12. The system of claim 10, wherein the sorted user permission list is sorted from least to most permissive permission associated with a first element, wherein for the first element of the sorted user permission list that the user is determined to have permission, assigning the permission of the element to the location of the data in the hypercube.

13. The system of claim 1, wherein the permission comprises one of: write permission, import and notes permission, read except notes permission, read permission, read with no splits permission, or no permission.

14. The system of claim 1, wherein the element of the user permission list further comprises a dimension associated with the element.

15. The system of claim 1, wherein the user permission list comprises a subset of a global permission list comprising entries of the global permission list associated with the user.

16. The system of claim 1, wherein modifying the tree structure of dimension values to allow description of the set of access region dimension values using the root node and the set of pruned nodes comprises adding a new node to the tree structure corresponding to the set of access region dimension values.

17. The system of claim 1, wherein modifying the tree structure of dimension values to allow description of the set of dimension values using the root node and the set of pruned nodes comprises adding a new subtree to the tree structure corresponding to the set of access region dimension values.

18. The system of claim 1, wherein modifying the tree structure of dimension values to allow description of the set of access region dimension values using the root node and the set of pruned nodes comprises adding a new node to the tree structure corresponding to the pruned set of dimension values for pruning.

19. The system of claim 18, wherein a subtree rooted at an ancestor node comprising an ancestor of the new node, wherein the new node is pruned from the subtree, corresponds to the set of access region dimension values.

20. A method for determining access for a hypercube, comprising:
   receiving a request for access from a user to data in a location in a hypercube;
   receiving a tree structure with subcubes of the hypercube arranged in a hierarchical structure;
   receiving a user permission list, wherein an element of the user permission list comprises a permission, a root node, and a set of pruned nodes, wherein the permission does not apply to the set of pruned nodes;
   determining, using a hardware processor, a user permission associated with the data in the location of the hypercube using the user permission list, wherein determining the user permission is based at least in part on whether a node associated with the location in the hypercube is pruned from a tree rooted at the root node;
   providing an indication of the user permission; and
   receiving an access region comprising a set of access region dimension values, an access region user or set of users, and an access region permission;
   modifying a tree structure of dimension values to allow description of the set of access region dimension values using the root node and the set of pruned nodes;
   creating a permission list element comprising the user or set of users, the permission, the root node, and the set of pruned nodes; and
   adding the permission list element to a global permission list.

21. A computer program product for determining access for a hypercube, the computer program product being embodied in a non-transitory computer readable storage medium and comprising computer instructions for:
   receiving a request for access from a user to data in a location in a hypercube;
   receiving a tree structure with subcubes of the hypercube arranged in a hierarchical structure;
   receiving a user permission list, wherein an element of the user permission list comprises a permission, a root node, and a set of pruned nodes, wherein the permission does not apply to the set of pruned nodes;
   determining a user permission associated with the data in the location of the hypercube using the user permission list, wherein determining the user permission is based at least in part on whether a node associated with the location in the hypercube is pruned from a tree rooted at the root node;
   providing an indication of the user permission; and
   receiving an access region comprising a set of access region dimension values, an access region user or set of users, and an access region permission;
   modifying a tree structure of dimension values to allow description of the set of access region dimension values using the root node and the set of pruned nodes;
   creating a permission list element comprising the user or set of users, the permission, the root node, and the set of pruned nodes; and
   adding the permission list element to a global permission list.

* * * * *